United States Patent [19]
Mokrytzki et al.

[11] 3,781,614
[45] Dec. 25, 1973

[54] INDUCTION MOTOR CONTROL SYSTEM

[75] Inventors: Boris Mokrytzki, Murrysville, Pa.;
Peter W. Hammond, Chagrin Falls, Ohio

[73] Assignee: Westinghouse Air Brake Company, Wilmerding, Pa.

[22] Filed: July 31, 1972

[21] Appl. No.: 276,540

[52] U.S. Cl. .................. 318/227, 318/230, 318/231
[51] Int. Cl. ......................................... H02p 5/40
[58] Field of Search.................... 318/227, 230, 231; 321/5, 14

[56] References Cited
UNITED STATES PATENTS

| | | | |
|---|---|---|---|
| 3,509,440 | 4/1970 | Johnston............................. | 318/227 |
| 3,593,103 | 7/1971 | Chandler et al. ................ | 318/227 X |
| 3,372,323 | 3/1968 | Guyeska ......................... | 318/231 X |
| 3,477,002 | 11/1969 | Campbell............................ | 318/227 |

*Primary Examiner*—Gene Z. Rubinson
*Attorney*—Ralph W. McIntire, Jr.

[57] ABSTRACT

This invention covers an auxiliary control system for automatically changing the operating point of an a. c. induction motor independent of normal control thereof in order to counteract voltage deviations either above or below a preselected range in which supply voltage to the input of a solid state inverter device controlling the motor must be maintained in order to prevent inadvertent system shutdown or damage. The motor operating point is moved toward a condition of motoring or regeneration, in accordance with the voltage deviation being of increasing or decreasing character, respectively, in order to adjust the level of power demanded by the motor and thereby counteract the voltage deviation until the inverter input voltage is restored to the desired level. The system is particularly useful in permitting the kinetic energy of a moving body, such as a railway vehicle, to provide regenerative voltage for maintaining inverter input voltage during periods of power interruption, such as occur in traversing line gaps.

9 Claims, 2 Drawing Figures

INDUCTION MOTOR CONTROL SYSTEM

BACKGROUND OF THE INVENTION

In the ever expanding rapid transit segment of the railroad industry, electrid d. c. traction motors have found almost universal acceptance as the drive mechanism for propulsion purposes as well as providing retardation effort by dynamic or regenerative braking. In that d. c. motors require brushes and commutators to periodically reverse the polarity of the motor windings as the rotor turns, it has long been recognized that d. c. motors have a fundamental weakness due to wear of the brushes, with a high incidence of armature failure as a result of the severe environmental conditions to which the motor is subjected.

With the advent of solid state technology, static inverters have been developed which are capable of economically transforming the available d. c. distribution power to an a. c. voltage suitable for motor operation, making it advantageous to employ a. c. induction type traction motors as a rapid transit vehicle drive. These inverters employ silicon controlled rectifiers, commonly referred to as SCR's or thyristors, to develop a polyphase a. c. signal for exciting the motor stator field windings. The resulting rotating field flux interacts with the rotor conductors to effect motor operation without the need for brushes and mechanical commutation. By controlling the switching rate and gating duration of the inverter SCR's, it is possible to vary both frequency and voltage to obtain torque/speed characteristics comparable to that of d. c. motors but with smoother transition through the several speed ranges.

It is well known in the art that in order to sustain the commutating action of the solid state type inverter, the SCR's must be continuously provided with a source of power of at least a certain predetermined voltage. Filter capacitors are provided at the inverter input to damp line voltage transients and to maintain inverter power relatively constant. In a practical application, however, the size of these filters and consequently their capacity is limited. It is apparent therefore that in traversing a line gap in which there is an interruption of power to the inverter, relatively fast discharge of the filter capacitors will occur. Where the line gap is caused by the formation of ice along a section of line, for example, sufficient time may elapse before power is restored to allow the level of capacitor charge to fall below a value capable of sustaining operation of the inverter.

It is also well established in the art that the inverter SCR's are capable of supporting limited levels of voltage without damage. Consequently, systems employing solid state inverters invariably also employ protective circuitry for safely interrupting power supply to the inverter to prevent damage to the SCR's when the voltage limitation established by the protective circuitry is exceeded.

The philosophy behind the need for such protective circuitry is based on the assumption that excessive voltage levels arise as a result of some system malfunction which would lead to a fault and subsequent system shutdown anyway. It is recognized, however, that short duration voltage transients do occur, which may exceed the filtering capabilities of the above-mentioned capacitors and may not be due to a system malfunction, but which may instead arise in the power supply system. Where regeneration of line power is provided by the dynamic energy of a nearby vehicle during braking, for example, short duration line surges may occur, depending upon the proximity of the vehicle being braked and the condition of the line voltage at the time. Without some means of compensating for temporary voltage surges, the system protective circuitry would function to effect a system shutdown unnecessarily.

oOther examples of line voltage transients occur as a result of variations in line inductance created by a vehicle as the vehicle load is applied to and removed from the line in accordance with the vehicle entering and vacating a specific segment of the supply line, respectively.

Obviously, undesirable delays encountered due to system shutdown resulting from these above-discussed problems are intolerable in high density revenue service and must be prevented from occurring in order that the advantages offered by the a. c. induction motor drive system may be more fully realized.

SUMMARY OF THE INVENTION

It is therefore the general object of the invention to provide means for sensing a deviation of input voltage at an inverter device controlling an a. c. induction motor, above or below a predetermined value in order to automatically effect control of the motor independent of the normal motor control for the purpose of counteracting the voltage deviation.

It is a further object of the invention to adjust the operating point of the motor dependent upon the above-mentioned voltage deviation being of increasing or decreasing character, with the level of power demanded by the motor being accordingly adjusted to draw more or less current, respectively.

It is yet another object of the invention to produce a motor control signal when a voltage deviation is sensed which corresponds to an operating point of the motor different from the actual operating point at which the motor is capable of counteracting the voltage deviation in order to counteract the voltage deviation more quickly.

It is still another object of the invention to effect transition of the motor from a motoring to a regenerative mode of operation in order to utilize the vehicle kinetic energy to generate voltage at the inverter input when an interruption of input power occurs.

Still another object of the invention is to control the degree of change of the motor operating point and consequently the motor response time to vary in accordance with both the amplitude and rate of change of voltage deviations sensed by the control system of the invention.

It is an extension of the last-mentioned object of invention to provide a fast response network for adjusting the motor operating point an amount which varies exponentially with voltage deviations exceeding a predetermined rate and a slow response network operable to provide more stable control of the motor operating point at the time the voltage deviation is substantially counteracted.

In accordance with the inventiion, an a. c. induction motor is driven at a frequency dictated by a static inverter which receives d. c. line power via a filter capacitor and converts it to variable frequency a. c. power at the polyphase outputs connecting the inverter to the motor stator windings. The rotor shaft of the motor includes a tachometer which produces a speed signal representing the rotor speed. The difference between the rotor speed and the frequency of the rotating field excitation is the motor slip frequency which determines the motor torque produced. The normal slip command signal, when algebraically summed with the effective speed signal, determines the proper frequency at which the inverter should drive the motor (rotating field frequency) to establish the motor operating point.

In realizing the objects of the invention, an auxiliary slip control circuit is provided which is capable of sensing inverter input voltage variations that exceed the damping ability of the line filter to accordingly effect variation of the normal slip command signal, in order to exert control of the motor operating point independent of conditions normally controlling motor opperation.

The auxiliary slip control circuit includes a spillover network which senses inverter input voltage and produces positive or negative going output spillover signals in accordance with a voltage deviation exceeding a preselected upper or lower voltage limit defining a range within which it is desired to maintain input voltage to the inverter. These spillover signals are connected to the summing junction of a first operational amplifier and alegbraically summed with the normal slip control signal. The spillover signals are also connected to the input of a second operational amplifier that includes a feedback network which produces an exponential response to the spillover signals. The first operational amplifier provides a slow response control network with linear gain and stable control, while the second operational amplifier cooperates with a third operational amplifier having a differentiating circuit in its input network to provide a fast response control network with a high gain output, the level of which reflects both the rate of change and the amplitude of the sensed voltage deviations.

For small line voltage deviations, the second amplifier operates in the low gain region of its exponential output curve, thereby allowing the first amplifier to establish the slip command signal. For higher voltage deviations, the second amplifier operates in its high gain region to drive the third amplifier, whose output is accordingly both amplitude and rate responsive. Thus, a fast change in input voltage results in a greater variation of the slip command signal than do voltages which change at a slower rate. The slip command signal is thus adjusted to an extreme initial value to reduce the motor response time and thus achieve a different operating point more quickly than otherwise possible. By adjusting the motor operating point, the level and/or direction of power flow is altered, depending upon the input voltage deviation and mode of motor operation at the time, in order to counteract the voltage deviation before the line voltage is able to assume a value sufficient to effect a system shutdown.

As the input voltage deviation recovers, the slow response network gains control of the slip command signal until the inverter input voltage is restored to the range within the spillover limits where the normal slip command circuit takes over.

Other objects, features and advantages of the present invention will become more apparent from a description of a preferred embodiment when considered with the accompanying drawings of which:

Figure 1:
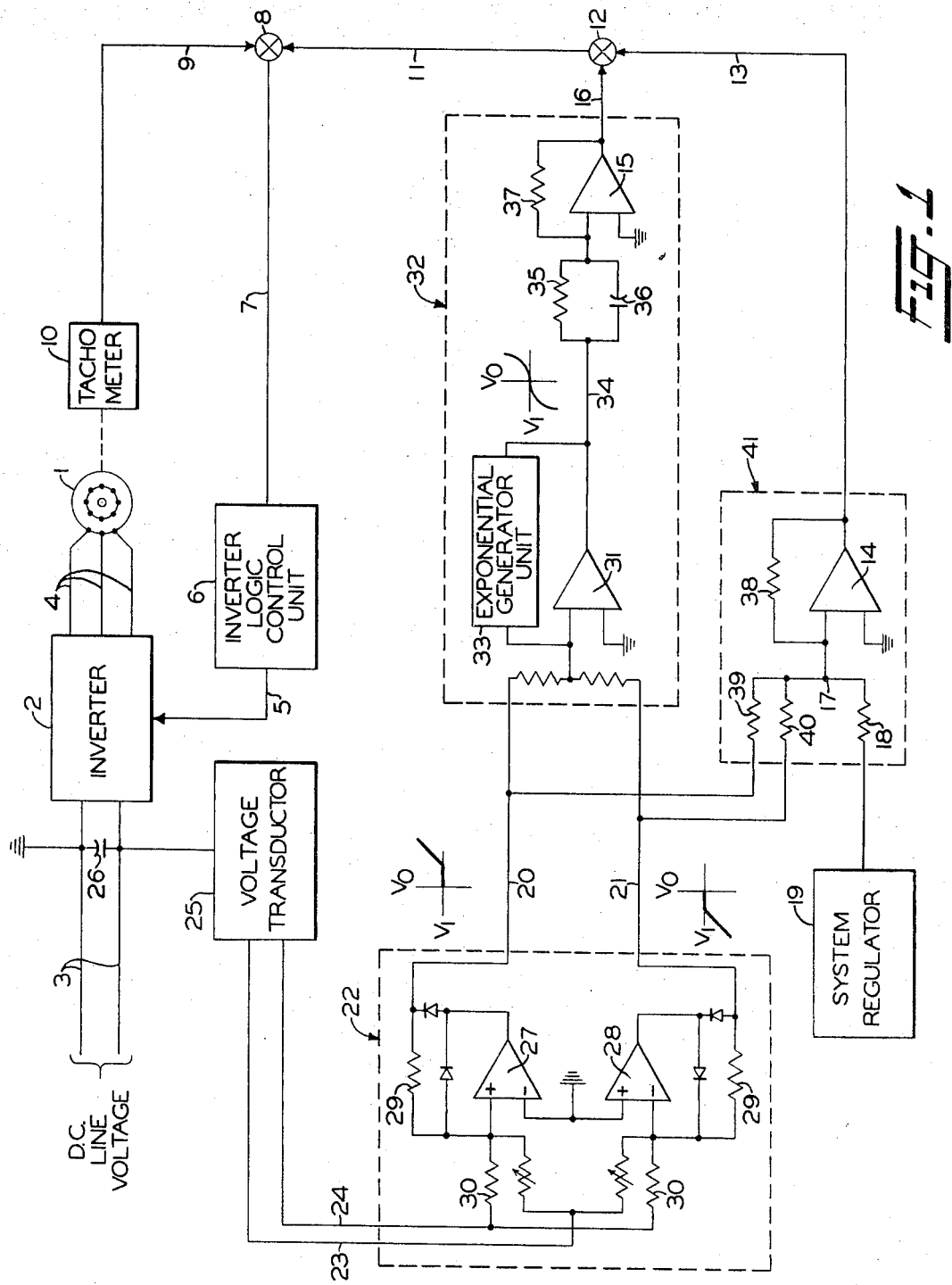
FIG. 1 is a schematic circuit diagram of the invention.

Referring to FIG. 1 of the drawings, there is shown a motor control system including one of several a. c. induction type traction motors 1 which may be arranged with the rotor thereof geared or otherwise fixed to rotate with the axles of a railway vehicle. Motor 1 consists of a plurality of poles spaced about its stator having windings which are excited by a polyphase a. c. voltage to produce a rotating magnetic field flux. The rate of this rotating flux is proportional to the frequency of the applied polyphase voltage and the direction of rotation is determined by the phase sequence. The motor also includes a rotor formed by a plurality of conductors, the windings of which have current induced by the rotating stator flux. The difference between the rotating speed of the stator flux and rotor speed is the slip frequency of the motor. This frequency acting on the rotor reactance results in a displacement of the rotor flux with respect to the stator flux, known as the torque angle. Interaction between the rotating stator flux and rotor flux due to this torque angle produces torque which causes the rotor to follow the rotating field. When the frequency of the rotating field exceeds the rotor speed, the motor assumes a motoring mode of operation in which electrical energy is converted to dynamic energy of the vehicle. When the frequency of the rotating field is less than the rotor speed, the motor assumes a regenerative mode of operation in which the dynamic energy of the vehicle is utilized to either generate current back to the line or to the resistive grids, while dissipating the kinetic energy of the vehicle.

Connected to the motor stator is a solid-state, static inverter 2 having a plurality of SCR switching networks which may be arranged in a manner similar to that shown and described in U. S. Pat. No. 3,207,974, issued Sept. 12, 1965 to W. McMurray. The inverter switching networks, one per phase, receive power from a common, fixed voltage, d. c. supply via power lines 3 and generate an a. c. output to the motor stator via lines 4 in accordance with gating signals which fire the inverter SCR's.

The gating signals which control the inverter are provided by a conduit 5 between inverter 2 and an inverter logic control unit 6. Conduit 5 represents a plurality of control wires carrying digital signals generated by the inverter logic unit 6 to render the appropriate SCR's of each inverter phase network conductive in the proper sequence to produce an a. c. output wave shape. Obviously, corresponding SCR's of the respective phase networks are triggered in time phase to obtain the rotating stator field flux, the frequency of which is determined by the switching rate at which the inverter SCR's are operated.

Details of the inverter logic unit 6 are not believed to be necessary for an understanding of the present invention, since any skilled digital logic designer, given the available inputs and desired outputs, could utilize Boolean Algebra or the more recently perfected Mahoney Mapping technique to formulate a software logic program capable of being reduced to appropriate hardware circuitry.

Although the logic unit 6 may in fact control inverter 2 in a fashion to provide a plurality of system control functions, only the function of varying the motor slip frequency need be discussed for an understanding of the present invention. Thus, logic unit 6 is shown with a wire 7 connected to it from a summing junction 8. A wire 9 connected to summing junction 8 has impressed upon it a signal representing the motor speed as monitored by a tachometer which is suitably mounted on the motor output shaft, while a wire 11 connected to summing junction 8 carries a signal representing the desired motor slip frequency. The resultant signal produced at wire 7 thus represents inverter frequency. The frequency of the rotating stator flux is thus controlled relative to the frequency or speed of the rotor to adjust the resultant slip frequency of the motor in accordance with the slip command signal at wire 11.

The slip command signal is generated at the output of a summing junction 12 to which is connected via wire 13 the output of an operational amplifier 14 and the output of an operational amplifier 15 via line 16. Connected to a summing junction 17 at the input of amplifier 14 via resistor 18 is an input signal generated by the system regulator 19 which may, for example, comprise an operator controlled rheostat or other signal generator. Also connected to summing junction 17 are upper and lower spillover signals at wires 20 and 21, respectively, of a spillover network 22.

Wires 23 and 24 provide input signals to spillover network 22 from a voltage transductor 25 which may preferably include conventional solid state circuitry to provide a constant positive d. c. reference voltage at wire 23 and a negative voltage at wire 24 corresponding to the voltage of a capacitor 26 across power lines 3, reduced by an appropriate attenuation factor. Capacitor 26 actually represents a bank of several filter capacitors provided to isolate line disturbances from the inverter/motor control system and at the same time prevent internally generated ripple current from entering the line 3 from the inverter.

Comprising spillover network 22 is a pair of operational amplifiers 27 and 28 having their inputs identically connected to wires 23 and 24. Each amplifier includes in its feedback circuit a conventional resistor diode arrangement which prevents the amplifiers from producing an output signal at wires 20 and 21 as long as the input, which reflects inverter supply voltage at capacitor 26, remains within a desired voltage range defined by the preselected upper and lower limits at which the respective amplifiers 27 and 28 operate. These limits are established by an adjustable current injected into the negative input of the respective amplifiers 27 and 28 subject to the reference signal generated at wire 23 by transductor 25. Until line voltage fluctuations exceed this desired range, no signal will occur at the spillover network output wires 20 and 21. Voltage excursions above or below this desired voltage range do, however, result in an output signal at wire 20 or wire 21, respectively. These outputs reflect the gain of the amplifiers 27 or 28, as determined by the relationship of the feedback resistors 29 with the input resistors 30 at the negative input of the respective amplifiers 27 and 28, which inputs are subject to the voltage at wire 24 representative of the effective supply voltage at capacitor 26. The relationship of the so-called spillover signals effective at wires 20 and 21 of spillover network 22 with the line voltage excursions, as reflected at input wires 23 and 24 are represented by the signal waveforms shown on the drawing at the outputs of spillover network 22.

From spillover network 22, wires 20 and 21 are connected to the input of an operational amplifier 31 which, together with amplifier 15, comprises a fast response slip control network 32. Arranged in the feedback network of amplifier 31 is an exponential generator circuit 33, details of which have been omitted for the sake of clarity, as circuitry of this type is common and therefore is well understood by those skilled in the art. It is to be understood, however, that the exponential generator circuit 33 functions to produce an exponential output signal, the character of which is represented by the waveshape accompanying output line 34 of fast response network 32. Thus, as the spillover signal at wire 20 or 21 develops, amplifier 31 initially operates with a low gain characteristic, progressively increasing in gain as the amplitude of the spillover signals increase.

The output of amplifier 31 is connected to the input of operational amplifier 15 via a conventional R-C proportional plus derivative circuit comprising a resistor 35 and a capacitor 36 in parallel. A resistor 36 in the feedback network of amplifier 15 is employed with the R-C network at the amplifier input to produce the output signal at wire 16 leading to summing junction 12, so that the amplifier gain exhibits a rate of change factor. In other words, amplifier 15 passes both a proportional term determined by the relationship of feedback resistor 37 with input resistor 35 and also a derivative term determined by the relationship of feedback resistor 37 with input capacitor 36.

Amplifier 14 is provided in its feedback network with a resistor 38, the relationship of which relative to either a resistor 39 or 40 determines the gain of the amplifier when the spillover circuit produces a signal at either wire 20 or 21, respectively, and establishes a slow response network 41. These spillover signals are selected so as to be greater than the maximum signal capable of being produced in accordance with the signal provided by the system regulator 19 via resistor 18. In the absence of a spillover signal, the relationship of resistor 38 with resistor 18 establishes the gain of amplifier 14 so as to be less than the gain when controlled by the spillover signals via resistors 39 or 40.

In operation, let it be assumed that normal supply voltage is effective at power line 3 so that the charge on the line filters represented by capacitor 26 is within a range defined by the preselected limits of spillover network 22. Consequently, there is no spillover signal effective at either wire 20 or 21 of spillover network 22, thereby leaving amplifier 14 operable in accordance with the input signal received from the system regulator 19 via resistor 18 to drive amplifier 14, the output of which is a desired torque command signal that is connected via wire 13 to summing junction 12. In the absence of a signal at summing junction 12 via wire 16, due to spillover network 22 being inactive in accordance with the assumed line voltage conditions, wire 11 passes a slip command signal to summing junction 8 corresponding to the torque demand signal at wire 13. In that the system is regulated to achieve a condition of equilibrium, any change in either the slip command signal due to a change in the output of the system regulator, or in the speed of the rotor due to a change in track grade, for example, will result in the signal at wire 7 being accordingly adjusted to cause the programmed logic unit 6 to drive inverter 2 at whatever frequency is necessary to establish and maintain the motor output torque as called for by the slip command signal.

Assuming the speed signal derived at wire 9 is of positive polarity, then positive slip command signals at wire 11 will cause the signal at line 7 to exceed the signal at wire 9, since the difference between the stator frequency controlled by the signal at wire 7 and the rotor frequency represented by the signal at wire 9 is the slip of the motor. Thus, positive slip command signals cause the stator field to lead the rotor, providing a motoring mode of operation in which the invertor establishes power flow from line 3 to the motor 1 to produce a driving torque at the rotor to propel the vehicle.

Conversely, negative slip command signals cause the signal at wire 7 to assume a value less than the signal at wire 9, resulting in the stator frequency being accordingly reduced by the inverter drive so as to lag the rotor frequency and thereby effect a regenerative mode of operation in which the motor 1 operates as an induction generator to brake the vehicle, dissipating its kinetic energy by passing current to either the line or the dynamic brake resistive grids. In this latter mode of operation, the direction of power flow is from the motor 1, operating as a generator, to the power line 3 via wires 4 and inverter 2, thereby utilizing the kinetic energy of the vehicle to help support the line voltage being used by other vehicles operating in a motoring mode of operation. Of course, if the line 3 is unable to accept additional current, a line contactor (not shown) is operative to cut in dynamic brake resistor grids (not shown) to dissipate the vehicle energy in the form of heat.

It is to be understood therefore that the normal motor control system is effective, as above explained, to regulate motor 1 in accordance with changes in the slip command signal effective at wire 11 and/or the motor speed signal at wire 9, it being of particular interest to note that the polarity of the slip command signal determines motor operation in either a motoring or regenerative mode.

Figure 2:
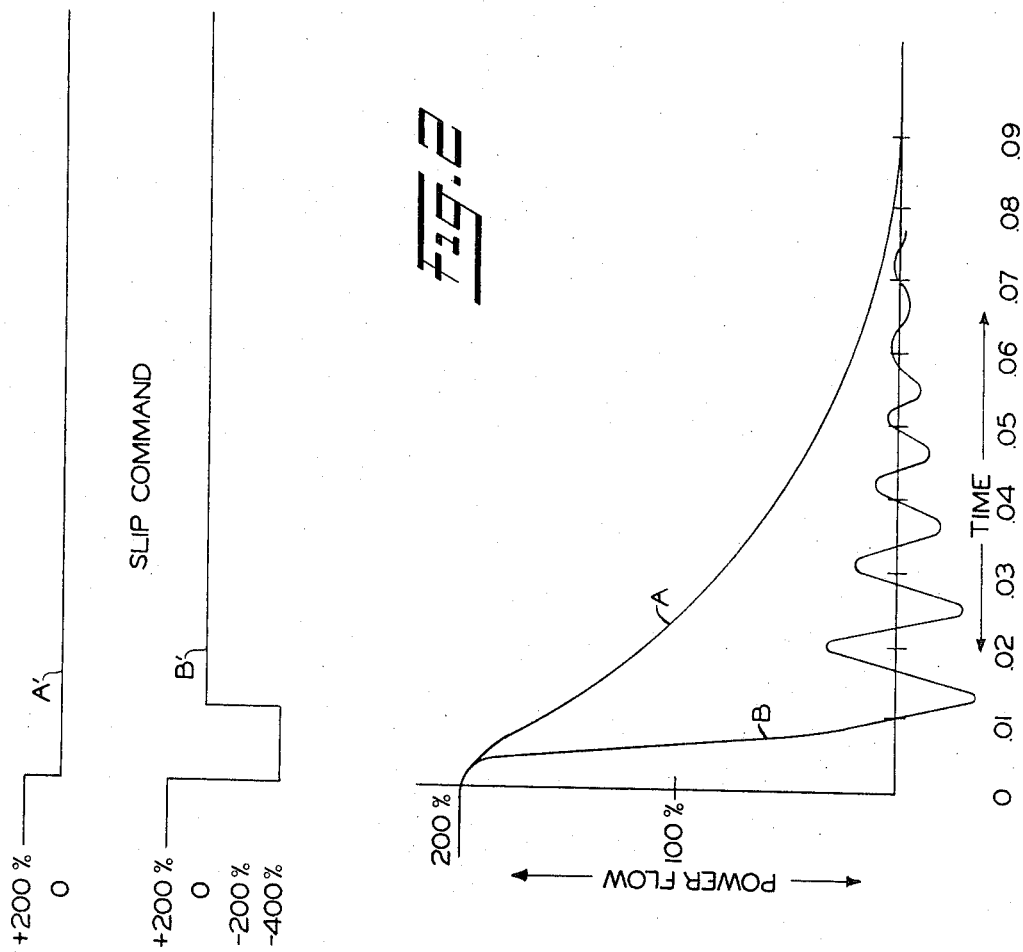
FIG. 2 is a graph comparing motor response curves obtained by employing two opposite extreme values of slip command to illustrate the concept employed in achieving an important feature of the invention.

In referring now to FIG. 2, curves A and B represent motor response times realized in accordance with corresponding slip command signals A' and B'. Curve A, for example, shows the time required for a particular motor to change from some given value of say 200 percent power flow in motoring to zero power flow when the slip command signal A' is adjusted from a value corresponding to the given value of power flow to zero. In this example, the power can be seen to decay nearly exponentially with a time constant of 0.03 seconds approximately. At this rate, the power flow does not reach zero until .09 seconds have elapsed.

It has been found possible to control the rate of response of the motor by forcing the slip command signal beyond a value corresponding to the level of power flow at which it is desired to operate the motor. For example, it can be seen from curve B that the time response of the same motor can be drastically reduced to approximately 0.01 seconds in accomplishing power flow transition from 200 percent of full load motoring to zero when the slip command signal B' is adjusted from a value corresponding to 200 percent full load motoring to an extreme value beyond zero corresponding to 400 percent full load regeneration.

Advantage is taken of this ability to obtain rapid response of the motor time constants, as hereinafter explained, for the purpose of counteracting line voltage deviations effective at inverter 2 before any adverse effect can result, such as loss of inverter power or an overvoltage tripoint, as previously mentioned.

Assume now that the motor 1 is operating in a motoring mode with the system in a state of equilibrium, and loss of power supply occurs at line 3, due for example, to the vehicle pantograph or other pickup device traversing a line gap. Capacitor 26 is cut off from its source of energy and begins to discharge, while supplying current to the inverter 2. It is understood of course, that the rate of discharge of capacitor 26 varies in accordance with the level of power drawn by the motor so that at high levels of power flow, the period during which capacitor 26 is able to sustain supply voltage to inverter 2 following loss of line voltage is relatively brief. The voltage level of capacitor 26 is sensed by transductor 25 to provide the reference signal at wire 23 and the signal at wire 24 which reflects the level of the capacitor. When this level drops below a preselected value as established by amplifier 28 of spillover network 22, a spillover signal is produced at wire 21 which becomes proportionally negative as the capacitor discharges below the preselected lower spillover limit, while amplifier 27 is insensitive to the voltage reduction and therefore produces no output at wire 20.

The lower spillover signal effective at wire 21 is fed to both the slow and fast response networks 41 and 32, respectively. At slow response network 41, the spillover signal is connected via resistor 39 to summing junction 17 where it is of sufficient amplitude to overcome the positive (motoring) signal provided by the system generator 19 in accordance with the assumed condition. In actual practice, amplifier 14 may be arranged to provide a non-inverted output or may simply utilize two amplifiers in series to obtain a non-inverted output. Thus, wire 13 provides a negative signal at summing junction 12.

At the same time, however, the negative going spillover signal at amplifier 31 of the fast response network is inverted and modified in accordance with the exponential generator circuit in its feedback network to provide a positive going signal which is changing in accordance with an exponential function. This exponential signal is modified by the differentiating effect of amplifier 15 and is again inverted, arriving at summing junction 12 via wire 16 as a large signal of negative polarity, the amplitude of which reflects the rate of change of the spillover signal at wire 21.

Assume that the motor power flow at the time of the line gap caused power interruption is such that the rate of discharge of capacitor 26 results in the output of fast response network 32 becoming sufficiently negative at summing junction 12 to adjust the slip command signal at wire 11 from a positive polarity corresponding to motoring mode of operation to some extreme negative value, as for example, a value corresponding to slip command signal B' of FIG. 2. Consequently, the signal of wire 7 is adjusted to cause logic unit 6 to drive inverter 2 at a drastically reduced frequency to obtain the desired slip forcing of the motor called for by the slip command signal at wire 11 and represented by the motor time constant curve B of FIG. 2. As illustrated by curve B, the motor power flow is caused to pass through zero nearly instantaneously in the transition from a motoring mode of operation to a regenerative mode of operation. In passing through a condition of zero power flow, the demand on inverter 2 is reduced so that the rate of discharge of capacitor 26 is also reduced. In regeneration, the dynamic energy of the vehicle is utilized to drive motor 1 so as to generate voltage for charging capacitor 26 via wires 4 and inverter 2, but more importantly the transition from motoring to regeneration occurs at such a fast rate that the capacitor is prevented from discharging below a value which would otherwise result in loss of the inverter commutating action and accordingly system shutdown.

As the charge of capacitor 6 is thus restored, the spill-over signal at wire 21 will gradually reduce in amplitude. As this occurs, the fast response network 32 will operate in the low gain region of the exponential output of amplifier 31, reducing the effect of the derivative action of the R-C network of amplifier 15. This permits slow response network 41 to assume control of the negative slip command signal, which becomes progressively reduced with a consequent adjustment in the motor power flow, until at some degree of regeneration, the system requirements and motor losses are balanced. This degree of regeneration has been found from experience to be relatively low so that the level of power flow drawn from the dynamic energy of the vehicle will result in only a minimum degree of retardation, thus allowing the vehicle to traverse line gaps of several miles, providing of course, that the speed of the vehicle is substantial at the time the line gap is encountered. In that amplifier 14 of slow response network 41 operates with low gain in adjusting the slip command signal to the level where a balanced condition exists, greater stability is realized without the system cycling between motoring and regeneration, as would otherwise occur if only the fast response network were to be utilized.

When the line gap is traversed, the normal line voltage will cause the spillover signal at wire 21 to finally disappear, permitting normal control of the motor by regulator 19 to be restored. This results in the negative slip command signal corresponding to a motoring mode of operation. Of course, in motoring mode of operation the power flow to the motor occurs by way of power lines 3, as previously mentioned, so that if another line gap is encountered, capacitor 26 will again begin to discharge, setting up another cycle of events in which the normal slip command signal is replaced by a slip command signal capable of forcing adjustment of the motor time constant to again effect transition of motor 1 to regeneration. It will thus be apparent from the foregoing that when loss of line voltage occurs due to the vehicle encountering a line gap, the system responds to counteract the voltage drop and the vehicle "coasts" through the line gap, with only sufficient power being generated from the kinetic energy of the vehicle to maintain the necessary inverter supply as reflected by the charge on capacitor 26 and to provide power for operating the vehicle lights, heating and other auxiliary electrical systems. It is of importance to note that if motor 1 were maintained in an extreme condition of regeneration for the duration of the line gap, sufficient kinetic energy could be removed from the vehicle to bring it to a halt in a section of track without power so that the vehicle would be incapacitated. Thus, the motor control system only adjusts the slip command signal initially to a value calling for an extreme condition of regeneration to more quickly get the motor into regeneration, but at an operating point therein where power flow is minimal.

It should also be mentioned at this point that in the event motor 1 is already operating in a regenerative mode when a line gap is encountered, capacitor 26 will be subject to regenerative voltage supply by motor 1. Since the line gap prevents regenerating into the line, the degree of power flow may exceed the system demand sufficient to raise the capacitor voltage to a level above the limit of spillover network 22, causing amplifier 27 to produce an output at line 20. The fast and slow response networks 32 and 41, respectively, act on the spillover signal, as previously explained, to adjust the slip control signal at wire 11, thereby changing the operating point of the motor to a lesser degree of regeneration in which the power flow is reduced to a level corresponding to the system demand. In controlling the voltage rise while arriving at this condition, however, it may occur that the rate of change of the spillover signal will momentarily drive the system into some degree of motoring mode to more quickly control the transient by absorbing power before the slow response network becomes effective to stabilize the system. It is to be understood therefore that in any event of motoring or regeneration in which the power supply from the line is interrupted, the system will stabilize in a slight degree of regeneration as dictated by the system power demand, thereby in effect "coasting" through the line gap while maintaining control of the inverter until line power is restored.

It is also of interest to note that the system operates even in the absence of a line gap to control capacitor voltage effective at the input of inverter 2. For example, a transient in the form of a voltage surge in line 3 can result form another vehicle in the vicinity operating in a regenerative mode or when another vehicle vacates the power line segment, while operating in a motoring mode, due to the stored inductive energy of the load being returned to the line. If such an occurrence should arise when the vehicle is operating in a motoring mode in which a positive slip command signal is effective at wire 11, a rising line voltage sufficient to produce an output spillover signal at wire 20 of spillover circuit 22 will drive fast response network 32, as previously explained, to produce a positive slip command signal at wire 16. Being of the same polarity as the normal slip command signal in this particular instance, however, the slip command signal will simply be driven to a value of increased positive polarity, rapidly forcing the motor to an operating point which produces increased current flow and thereby in effect absorbs the line voltage surge. It is understood, in this case, that there is no transition in the mode of motor operation, but simply a forced change in the motor operating point, which occurs very rapidly due to the amplitude of the forced slip command signal corresponding to an extreme operating point of the motor, as previously explained.

If on the other hand the voltage transient is in the form of a line voltage depression, due for example to another vehicle entering the line segment on which the vehicle in question is operating, the system will effect a change in the operating point of the motor toward regeneration sufficient to reduce the power flow drawn from the capacitor. It is assumed under such condition that the motor will not actually be forced into regeneration, as occurs when the transient is due to a line gap voltage interruption, but merely approaches a zero power flow condition in motoring mode to counteract the voltage depression of the line until the transient expires.

Similarly, if the motor is in regeneration when a line voltage transient of decreasing character occurs, the operating point of the motor is shifted to a further extreme condition of regeneration to counteract the voltage depression while conversely, a transient of increasing character results in the motor operating point being shifted toward motoring mode to decrease the degree of regeneration.

It is to be recognized, therefore, that the system operates in accordance with line voltage variations in excess of predetermined limits to not only change the operating point of the motor in order to maintain the line voltage within limits, but equally important, employs the technique of slip forcing to more quickly change the motor operating point in order to suppress a tripoint by the overvoltage protection circuitry. Of course, if the line voltage transient is so severe or of such extended duration as to indicate a system malfunction, the slip forcing control of the motor will be unable to control the transient and the overprotection circuitry will be effective to trip out the system.

From the above, it will be apparent that system shutdown due to line gap caused voltage interruptions in particular and other relatively short term transients may be suppressed by employing the above-explained slip forcing technique as a means of adjusting the operating point of the motor more quickly than would otherwise be possible.

I claim:
1. A system for regulating the operating point of an a. c. motor to control the power flow thereof in either a motoring or regenerative mode comprising:
   a. inverter means including a plurality of switching elements via which a source of d. c. voltage at the input of said inverter is interconnected with said motor;
   b. logic means for gating said switching elements at a rate that determines the frequency at which said inverter means is driven;
   c. regulator means for providing a slip control signal of variable magnitude to control the gating frequency of said logic means; and
   d. control means operative responsive to a voltage deviation at the input of said inverter means in excess of a predetermined amount for adjusting said slip control signal independent of said regulator means to effect a change in the operating point of said motor such as to counteract said voltage deviation, said control means being characterized by a fast response slip control network for adjusting said slip control signal to an extreme value corresponding to an operating point of said motor beyond the actual operating point at which said voltage deviation is counteracted, thereby causing said motor to reach said actual operating point at a rate exceeding a rate determined by the normal time constant to said motor.

2. The system as recited in claim 1, further characterized in that said fast response slip control network includes first amplifier means operative to concurrently reflect both a proportional and derivative term for providing an output at said fast response slip control network to effect adjustment of said slip control signal in accordance with the magnitude and rate of change of said voltage deviation.

3. The system as recited in claim 2, further characterized in that said first amplifier means is provided at its input with parallel connected resistive and capacitive means which cooperate with resistive means in the feedback path of said first amplifier means to provide said proportional and derivative terms with such gain as to adjust said slip control signal to said extreme value.

4. The system as rectied in claim 2, wherein said control means further comprises:
   a. a slow response slip control network including second amplifier means for producing an output at said slow response slip control network in accordance with the magnitude of said voltage deviation; and
   b. said fast response slip control network further including third amplifier means having a non-linear gain curve and having its output connected to the input of said first amplifier means; and
   c. first summing means for adjusting said slip control signal in accordance with the sum of said fast and slow response slip control network outputs.

5. The system as recited in claim 4, further characterized in that the output of said slow response slip control network is greater than the output of said fast response slip control network when said third amplifier means is operating in the low gain region of its non-linear gain curve and less than the output of said fast response slip control network when said third amplifier means is operating in the high gain region of its non-linear gain curve.

6. The system as recited in claim 4, further characterized in that said third amplifier means includes means in its feedback network for generating said non-linear gain curve in accordance with an exponential function.

7. The system as recited in claim 4, wherein said control means further comprises sensing means for providing a spillover signal proportional to the magnitude of said voltage deviation in excess of said predetermined amount, said spillover signal being connected to the inputs of said second and third amplifier means, said second amplifier means being disposed intermediate said regulator means and said first summing means with said slip control signal provided by said regulating means being connected to the input of said second amplifier means in parallel with said spillover signal for algebraic summation therewith to effect adjustment of said slip signal providing the output of said slow response slip control network.

8. The system as recited in claim 7 wherein said sensing means comprises amplifier means operative responsive to said voltage deviation exceeding a value corresponding to the upper limit of a range representing said predetermined amount for providing said spillover signal in one sense and responsive to said voltage deviation exceeding a value corres-ponding to the lower limit of said range to provide said spillover signal in the opposite sense.

9. The system as recited in claim 4, further comprising:
   a. speed sensing means for providing a speed signal representing the speed of said motor; and
   b. second summing means for providing a frequency signal to control the gating frequency of said logic means in accordance with the algebraic summation of said speed signal and said slip control signal.

* * * * *